United States Patent [19]
Fletcher et al.

[11] 3,953,674
[45] Apr. 27, 1976

[54] TELEMETRY SYNCHRONIZER

[76] Inventors: James C. Fletcher, Administrator of the National Aeronautics and Space Administration, with respect to an invention of Carroll T. Pardoe, Woodbine, Md.

[22] Filed: Apr. 4, 1975

[21] Appl. No.: 565,290

[52] U.S. Cl. ............................. 178/69.5; 328/155; 340/147 SY; 340/207 P
[51] Int. Cl.² .......................................... H04L 7/00
[58] Field of Search ............... 328/155; 340/147 SY, 340/207 P, 146.1 D; 178/69.5; 302/269

[56] References Cited
UNITED STATES PATENTS

| | | | |
|---|---|---|---|
| 3,271,688 | 9/1966 | Gschwind et al. | 328/155 X |
| 3,591,720 | 7/1971 | Othmer | 178/69.5 R |
| 3,629,503 | 12/1971 | Rempert | 178/69.5 R |
| 3,683,345 | 8/1972 | Faulkes et al. | 340/207 P |
| 3,889,186 | 6/1975 | Larson | 328/155 X |

OTHER PUBLICATIONS
IEEE Transactions on Communication Tech., Vol. Com. 13, No. 4, Dec. 1965, "Acquisition of Pseudonoise Signals by Sequential Estimation", by Ward.

*Primary Examiner*—John S. Heyman
*Attorney, Agent, or Firm*—Ronald F. Sandler; Gary F. Grafel; John R. Manning

[57] ABSTRACT

Simultaneous phase lock and synchronization acquisition of an L format biphase input signal having a pseudorandom sequence are obtained with a delay lock loop including a feedback shift register for deriving a first non-return to zero (NRZ) output signal having the same pseudorandom sequence as the input signal. An output of the shift register is compared with the input signal to derive a phase indicating binary error signal that is fed to a digital filter for deriving a binary output signal to control the transition times of a clock signal derived from a voltage controlled clock source. The digital filter is activated and the shift register is advanced in response to the clock signal. The input signal is converted into a second NRZ signal that has the same information content as the input signal. The first and second NRZ signals are compared to derive a further signal indicative of an estimate of the correlation function between the input signal and the output signal of the shift register. To provide an estimate of the pseudorandom input signal, the feedback shift register is loaded with bits of the second NRZ until the correlation value achieves a predetermined value. The synchronizer stays in a search mode until the correlation value achieves a predetermined value after a complete frame of the input signal has been received. Thereafter, the system is switched into a verify mode, during which tests are performed to determine if the system should revert back to the search mode or go into a lock mode. In response to K consecutive good frames wherein the correlation value achieves the predetermined value the system is activated into the lock mode; in response to L consecutive bad frames the system reverts back to the search mode. The system stays in the lock mode until M consecutive bad frames are received.

18 Claims, 5 Drawing Figures

U/D COUNTER SAMPLING INTERVAL

FIG. 2A  BIPHASE INPUT
FIG. 2B  NRZ INPUT
FIG. 2C  EX OR OUTPUT

FIG. 4A  INPUT CODE | 1 | 1 | 0 | 0 | 1 |

FIG. 4N  OUTPUT CODE | x | x | 1 | 1 | 0 | 0 | 1 |

TELEMETRY SYNCHRONIZER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

The present invention relates generally to telemetry data synchronizers and more particularly to a telemetry data synchronizer for achieving phase lock and synchronization of an input signal having a pseudorandom sequence.

BACKGROUND OF THE INVENTION

In the *IEEE Transactions on Communication Technology*, December, 1965, pages 475-483, Ward discloses a telemetry synchronizing system wherein bit synchronization of a received signal in the form of a pseudorandom non-return to zero (NRZ) sequence, is attained followed by phase adjustment of the received signal and a locally generated signal. The prior art system includes a delay lock loop having a feedback shift register for deriving a locally generated pseudorandom NRZ signal having the same sequence as the received signal. The shift register derives a pair of time delayed output bits that are separately compared with a replica of the received signal. Typically, the received signal leads one of the output bits by one-half a bit length and lags the other bit by one-half a bit length.

Signals resulting from the comparisons are added together to derive a phase indicating analog error signal that is applied to an analog filter. The filter derives a signal to control the phase of a clock wave derived from a voltage controlled oscillator. The clock wave controls shifting of signals initially loaded into the shift register stages as an estimate of the initial bits in the locally generated pseudorandom sequence. The estimate of the initial bits is derived by loading the shift register with received bits of the input signal.

The NRZ output signal of the shift register is compared with the received NRZ signal to derive a second analog error signal which is supplied to a low pass analog filter which drives a threshold detector. In response to the threshold of the detector being reached or exceeded, the received bits are no longer loaded into the shift register and the delay lock loop corrects any initial misalignment due to the relative phases of the received signal and the voltage controlled oscillator.

It is necessary to employ the threshold detector to determine the correlation between the locally generated and received pseudorandom sequences because the delay lock loop has an ambiguity in its response. In particular, the phase indicating error signal supplied to the voltage controlled oscillator has a zero value for three different conditions; to wit: (1) when the input signal is one-half a bit displaced from the two output bits of the shift register stages; (2) when the input signal is lagging one of the output bits by one bit; and (3) when the input signal is leading the other output bit by one bit. Between these three zero points are peak positive and negative error signals that are supplied to the voltage controlled oscillator; one peak occurs when one output bit and a bit of the input signal are in phase; the second peak occurs when a bit of the received signal and the second output bit overlap. By detecting when the correlation function between the received and locally generated pseudorandom sequences exceeds a threshold value, the ambiguity is resolved.

While the prior system reported by Ward in the December, 1965 *IEEE Transactions* is a considerable improvement over earlier art systems for acquiring pseudorandom sequences, it appears to have certain disadvantages. In particular, the Ward system is apparently adapted for use only in connection with NRZ signals and is not adapted to be utilized with L format biphase signals. Further, it appears that the prior art system functions by initially determining if synchronization exists between the locally generated and received pseudorandom sequences and then correcting any misalignment due to the relative phases of the two received signals and the output signal of the voltage controlled oscillator. Such sequential operation is disadvantageous because it does not simultaneously achieve phase lock and synchronization, which implies less than optimum phase lock and synchronization acquisition time. It would also appear that if there is a severe misalignment between the relative phases of the received signal and the voltage controlled oscillator the correlation threshold may not be reached even when the received and locally generated pseudorandom sequences are the same.

BRIEF DESCRIPTION OF THE INVENTION

In accordance with one aspect of the present invention, a delay lock loop is provided that is particularly adapted to receive L format biphase input signals. Biphase signals are frequently employed in telemetry applications because each bit of the signal has a transition from one binary level to another to provide bit synchronization. In an L (level) format biphase signal, the transiton occurs in the middle of the bit; each bit is arranged so that a binary zero is represented as low and high levels during the first and second halves of the bit, while a binary one is represented as high and low levels during the first and second halves of the bit.

The received L format biphase signal is applied to a delay lock loop including a feedback shift register for deriving an NRZ signal having the same pseudorandom sequence as exists in the received signal. The NRZ output signal of one stage of the shift register is compared with a biphase replica of the received signal to derive a binary error signal that is coupled to a digital filter which derives an output signal for controlling a voltage controlled clock.

The term voltage controlled clock, as utilized in the present specification and claims, is a generic term referring to a source of clock pulses having variable transition times. As such, the term refers to a voltage controlled, variable frequency oscillator, or a constant frequency, voltage controlled variable phase oscillator. The oscillator may derive a binary, clock signal of pulses or square waves having transitions that are controlled in occurrence time. A voltage controlled clock is thereby intended to cover a multi-phase clock source having multiple output leads on which are derived phase displaced binary wave trains that are fed to a selector network, wherein the signal on one of the leads is coupled to a single output line.

Preferably, the error signal is applied to a digital filter, in the form of an ideal, resettable integrator including a counter that indicates the phase relationship between each bit of the NRZ shift register and biphase input signals. The phase error of several bits is accumulated in the counter which periodically derives an output signal to control the phase of the clock signal coupled to the feedback shift register and digital filter.

The delay lock loop utilized to provide phase control between the received pseudorandom sequence and the locally generated pseudorandom sequence derived by the feedback shift register suffers from similar ambiguity problems as exist in the prior art. To resolve the ambiguity, an estimate of the received pseudorandom sequence is initially loaded into the feedback shift register which is thereafter advanced in response to the clock output of the voltage controlled clock. In a second binary comparator, NRZ output signal of the shift register is compared with an NRZ signal having the same information as the received L format biphase signal. The second comparator derives a correlation function estimate of the degree of match between the received and locally generated pseudorandom sequences. In response to the correlation function estimate being greater than a predetermined level after one complete pesuedorandom sequence, i.e., synchronization frame, has been received, the synchronizer is activated out of a search mode and pseudorandom estimates are no longer loaded into the feedback shift register.

The present system achieves simultaneous phase locking and synchronization because of: (1) the digital filtering and digital control of the voltage controlled clock, and (2) the simultaneous comparison of (a) the received biphase signal with the locally generated pseudorandom sequence and (b) the NRZ signal having the same information content as the received biphase signal with the locally generated pseudorandom sequence. Thereby, the possible problems of the prior art system dislcosed by Ward are obviated.

As a further feature of the present invention, synchronization time is decreased by examining the correlation function estimate between the received and locally generated pseudorandom sequences more often than once during each sequence. In particular, after predetermined segments of a locally generated pseudorandom sequence have been compared with the received sequence, the value of the correlation function estimate is tested against predetermined levels that increase as the length of the segments increase. If the correlation function estimate is less than predetermined value after any sgement has been completed, the feedack shift register reloaded reload with bits from the received signal and the search operation is restarted.

In accordance with another aspect of the invention, the system is activated into a verify state after one frame of the received signal has exceeded the threshold level for the correlation function estimate. The system stays in a verify state until K consecutive "good" frames have been received or L consecutive "bad" frames have been received. The terms good and bad frames refer to frames wherein the correlation function estimates are respectively above and below the threshold values. In response to L consecutive bad frames being received, the system reverts back to a search mode, wherein the shift register is reloaded with signals indicative of the received bits. In response to L consecutive good frames being received, the system is activated into a lock mode, where it stays until M consecutive bad frames are received, at which time the system switches back to the verify mode.

It is, accordingly, an object of the present invention to provide a new and improved system for achieving phase lock and synchronization of a received signal having a pseudorandom sequence.

Another object of the invention is to provide an apparatus for simultaneously achieving phase lock and synchronization of an input signal having a pseudorandom sequence.

A further object of the invention is to provide a new and improved delay lock loop.

A further object of the invention is to provide a delay lock loop particularly adapted to be responsive to an L format biphase signal having a pseudorandom sequence.

Still another object of the invention is to provide a delay lock loop employing only digital circuitry.

Yet another object of the invention is to provide a new and improved apparatus for locking onto and to acquiring synchronization of an input signal having a pseudorandom sequence, which apparatus is capable of achieving synchronization more rapidly than the prior art.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
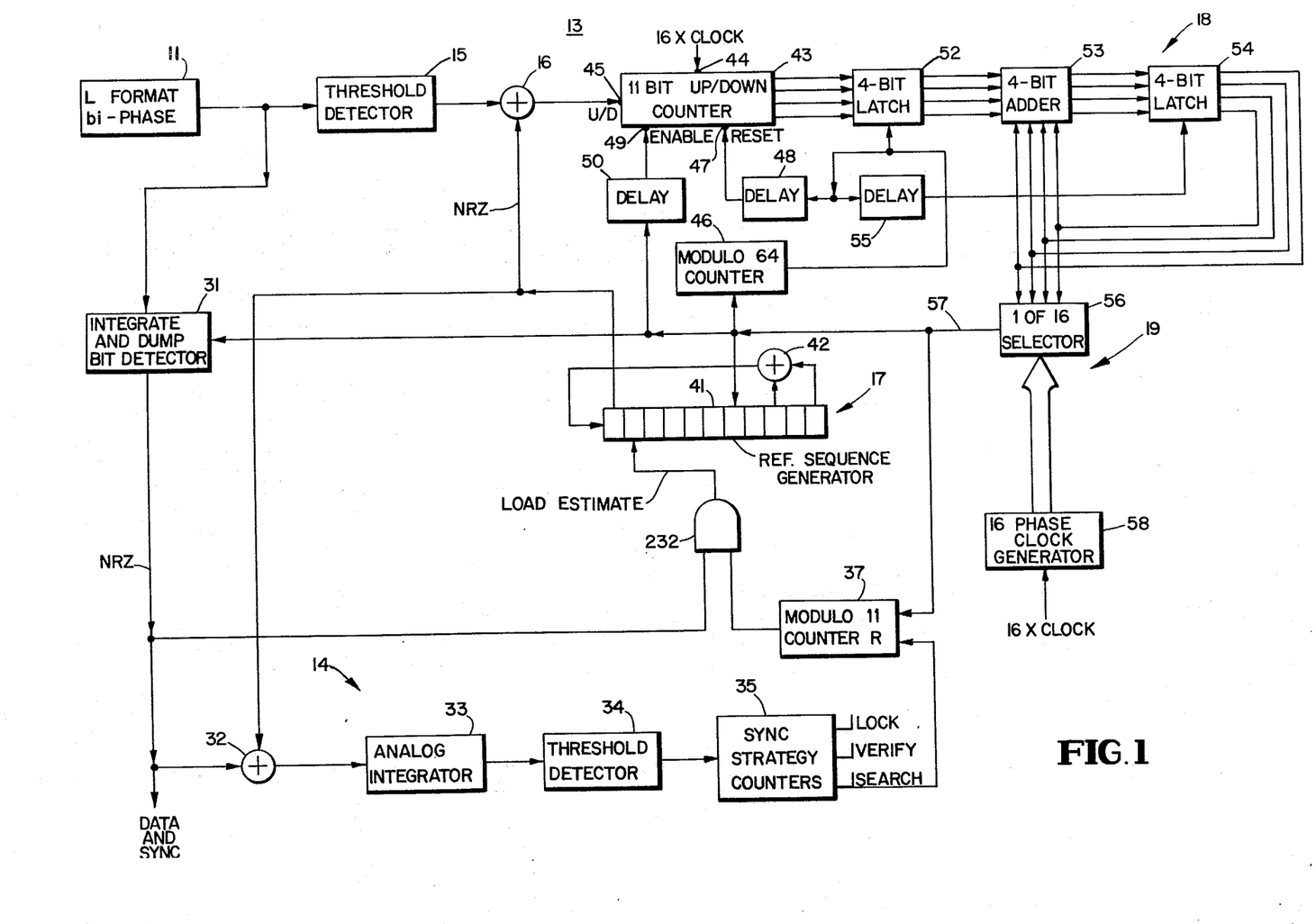
FIG. 1 is a block diagram of a preferred embodiment of the present invention.

Reference is now made to the block diagram of FIG. 1 wherein there is illustrated a source 11 of an L format biphase input signal having a pseudorandom sequence. Source 11 may be a modulation detector of a telemetry receiver that responds to a pseudorandom sequence transmitted from a remote telemetry transmitter.

Figure 2A:
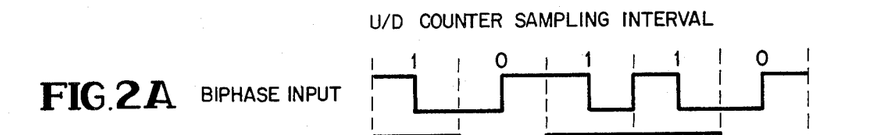
FIG. 2 are illustrations of waveforms in the apparatus of FIG. 1.

The output signal of source 11, in an idealized situation, is illustrated in FIG. 2A and includes, for each bit, a level transition in the center of the bit; each bit has a boundary indicated by a vertical line, whereby for a five bit signal as depicted in FIG. 2A, the bit boundaries are indicated by the reference numerals 20–25. Binary one bits are respectively indicated by high and low levels during the first and second halves of the bit, while binary zero levels are respectively indicated by low and high levels during the first and second halves of the bits.

The L format biphase output signal of source 11 is applied in parallel to a delay lock loop 13 and network 14 for determining the correlation function estimate between the received signal derived from source 11 and a locally generated pseudorandom sequence derived from delay lock loop 13.

Broadly, delay lock loop 13 includes a binary threshold detector 15 which derives a binary L format, biphase output signal in the form of a pseudorandom sequence that contains the binary information in the signal of source 11. The output signal of threshold detector 15 is compared with an NRZ pseudorandom sequence that is derived from feedback shift register 17. The pseudorandom sequence derived from feedback shift register 17 is identical to the pseudorandom sequence originating at a telemetry transmitter which drives source 11. When the bit values derived from feedback shift register 17 are simultaneously the same as the bit values derived from source 11 over a complete frame of the pseudorandom sequence, perfect correlation exists between the received and locally generated sequences. If the correlation is less than perfect, but is greater than a predetermined value, synchronization is still assumed to exist between the received and locally generated pseudorandom sequences.

Figures 2B, 2C:
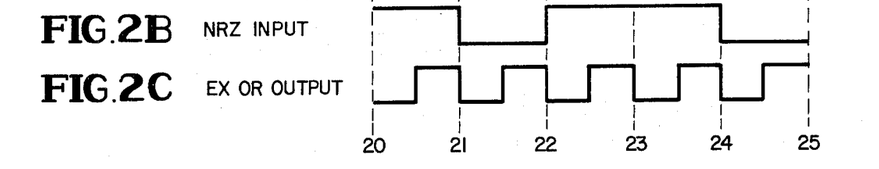

In response to synchronization existing between the received and locally generated pseudorandom sequences, EXCLUSIVE OR circuit 16 derives a square wave having transitions in synchronism with the transitions of the biphase output of detector 15. If there is a phase displacement between the locally generated pseudorandom sequence and the received pseudorandom sequence, EXCLUSIVE OR circuit 16 derives an output signal having positive and negative going transitions during each bit of the biphase signal. As indicated by FIG. 2B, the NRZ output of feedback shift register 17 has the same bit period as the biphase output signal of threshold detector 15; however, transitions in the NRZ signal occur at the beginning and end of each bit period, rather than in the center of the bit, as in the L format biphase signal. The phase of the output signal of EXCLUSIVE OR circuit 16, relative to the center of each NRZ bit derived from register 17, provides an indication of the phase difference between the biphase and NRZ inputs to the EXCLUSIVE OR circuit. In response to the transition of the biphase bit occurring at the center of the NRZ bit derived from feedback shift register 17, EXCLUSIVE OR circuit 16 derives a transition that occurs in the center of the NRZ bit to indicate an in phase relation between the two inputs to circuit 16. This is the idealized situation indicated by the waveforms of FIGS. 2A–2C, which respectively represent the biphase and NRZ inputs and the output of circuit 16. In response to the biphase transition occurring before and after the center of an NRZ output bit of register 17, EXCLUSIVE OR circuit 16 generates positive and negative transitions that are displaced from the center of the NRZ bit.

To provide a digital indication of the relative phase between the received biphase and locally generated NRZ signals over a number of bits, the output of EXCLUSIVE OR circuit 16 is applied to a digital filter 18 that is an ideal resettable integrator. Filter 18 derives a binary output once after a predetermined number of the biphase input bits have been compared with the NRZ output signal of feedback shift register 17. This error signal controls the phase of a square wave derived from voltage control clock 19. The output of clock 19 controls the activation of digital filter 18, as well as clocking or shifting of bits through feedback shift register 17, except when the feedback shift register is being loaded with an estimate of the pseudorandom sequence being received.

To derive the pseudorandom sequence that is initially loaded into feedback shift register 17 and to decode the data in the L format biphase signal derived from source 11, the source signal is applied to a biphase to NRZ detector 31 that is clocked by the output of voltage control clock 19. The output of detector 31 is selectively coupled to the input stages of feedback shift register 17 via AND gate 232 when the system is initially activated into a search mode. Thereby, feedback shift register 17 is loaded with NRZ bits that contain the same information as the L format biphase signal to form an estimate of the pseudorandom sequence originating at the remote telemetry transmitter and coupled to source 11.

The NRZ output of detector 31 is compared with the NRZ output of the first stage of feedback shift register 17 in EXCLUSIVE OR circuit 32. The output signal of EXCLUSIVE OR circuit 32, over a number of bits of the biphase signal, provides a correlation function estimate between the locally generated and received pseudorandom sequences. A measure of the correlation function is derived by feeding the output of EXCLUSIVE OR circuit 32 to analog integrator 33 which derives a D.C. output singal that is coupled to threshold detector 34. The output of threshold detector 34 is applied as a control signal to sync strategy counters 35 which activate the apparatus into a search mode, verify mode, and lock mode.

With the system in a search mode, the output of threshold detector 34 is examined after a complete sequence or frame of the pseudorandom sequence has been received. In response to the threshold detector indicating that the output of integrator 33 is above a predetermined level after a complete sequence has been received, synch strategy counters 35 are activated to the verify mode.

Prior to the system being activated out of the search mode, the threshold level of detector 34 is periodically tested against a reference level which increases as the length of the search sequence interval increases. If, upon the completion of any of these tests, the threshold is not reached, the system is activated back into an initial search state, whereby feedback shift register 17 is again loaded with the output of detector 31. To this end, a pulse is derived from counters 35 in response to the system being initially activated into the search mode. The pulse resets counter 37, having a modulus equal to the number (N) of stages in shift register 17, and a clock input responsive to the output of clock 19. Thereby, counter 37 is activated so that it derives a binary one output during the initial N pulses derived from clock source 19 while the system is in the search mode. The binary one output of counter 37 enables AND gate 232 which couples the NRZ output of detector 31 into the second stage of feedback shift register 17.

Simultaneously with synchronization being indicated by the output of detector 34 being greater than a predetermined level for one complete search frame of the pseudorandom input sequence, delay lock loop 18 causes the NRZ output of feedback shift register 17 to be in phase with the biphase output of threshold detector 15. This result is achieved because of the synchronized relationship between the activation rate of digital filter 18, shift register 17, detector 31 and digital comparison circuits 16 and 32.

After the sync strategy counters 35 have been activated so that the system is no longer in a search mode, the system is activated so that it is in a verify mode. With the system in the verify mode, the output of integrator 33 is tested against a threshold value after each frame of the telemetry signal has been received to determine if a good or bad frame was received, i.e., a frame wherein the output of integrator 33 is greater or less than the threshold level of detector 34 for one frame. In response to L consecutive bad frames being received the system is activated back into a search mode and the search process is reinitiated. In response to reception of K consecutive good frames, counters 35 are activated so that the system switches into a lock mode. The system is maintained in a lock mode until M consecutive bad frames have been received, at which time it reverts back to the verify mode, from which the system can go back to the search and lock modes.

In one embodiment of the device, the pseudorandom sequence has a duration of 2,047 bits and is represented by the equation: $X^{11} + X^9 + 1 = 0$. Such an equation is synthesized in FIG. 1 by an eleven stage shift register 41 wherein stages nine and eleven have outputs connected to EXCLUSIVE OR circuit 42, which derives a binary output that is coupled back to the input of the first stage of the shift register. Since an eleven stage shift register is employed, counter 37 has a modulus of eleven and derives a binary one output for the first eleven bits of the search mode.

In the embodiment of FIG. 1, control signals for the phase of clock source 19 are derived once every 64 bits of the received signal. The filter includes eleven bit up/down counter 43 having a four bit parallel output, wherein the highest order bit represents the polarity or sign of the count stored in the counter and the other three bits represent the three most significant magnitude bits. Counter 43 includes a clock input terminal 44 that is responsive to constant frequency and phase clock pulses that are derived from a suitable oscillator and at a rate sixteen times the clock rate of the output of voltage control clock 19, whereby $2^{10} = 1028$ clock pulses are supplied to terminal 44 during each 64 bit period activation time of filter 18. Counter 43 also includes an up/down input control terminal 45 responsive to the phase indicating output signal of EXCLUSIVE OR circuit 17.

Counter 43 is reset every 64 bit periods, by feeding the output signal of voltage control clock 19 to modulo 64 counter 46, which derives an output pulse after 64 consecutive pulses have been derived from voltage control clock 19. The output signal of counter 46 is applied to reset input terminal 47 of counter 43 via a delay network 48, which has a slight delay time to reset the counter after the contents of the counter have been read out once every 64 bits of clock source 19.

To enable counter 43 to derive a count indicative of the phase error indicated by the transition time at the output of EXCLUSIVE OR circuit 16, the counter is enabled so it is responsive to the clock pulses at terminal 43 for only one-half of each bit period, for an interval centered around the middle of each NRZ bit derived from feedback shift register 17. To this end, the output of voltage control clock 19 is coupled to enable input terminal 49 of counter 43 via a delay network 50. Delay network interposes a delay of one-quarter bit on the leading edge of each transition in clock signal derived by voltage control clock 19 and feeds a binary one level to the enable input terminal of counter 43 for one-half a bit period of the output of voltage control clock 19. Thereby, counter 43 is activated only in the center of each NRZ bit derived from feedback shift register 17 and ignores transitions at the beginning and end of each L format biphase bit, where there is no information available. If the two bits supplied to EXCLUSIVE OR gate 16 are in phase synchronization, a transition occurs at the up/down input terminal 45 exactly in the center of an enable input pulse of counter 43. Thereby, the number of clock pulses supplied to terminal 44 during the up and down periods of enable period are the same and there is no change in the state of counter 43. If the two input bits to EXCLUSIVE OR circuit 16 are not in phase during an enable period of clock 43, the state of the counter is adjusted upwardly or downwardly because the number of clock pulses coupled into counter 43 is greater while the counter is in the up state than in the down state, or vice versa. Upon the completion of 64 bits of clock source 19, counter 43 stores an indication of the total phase error between the two input signals applied to EXCLUSIVE OR circuit 16 over the 64 bit period.

The phase error count stored in counter 43 at the end of 64 bits of clock source 19 is read out and added to a previous accumulation of the phase error between the two inputs to EXCLUSIVE OR circuit 16. To these ends, the four most significant bit outputs of counter 43 are applied in parallel to four bit latch 52 that is activated in response to the output of modulo 64 counter 46. Latch 52 thereby stores a four, parallel bit signal indicative of the count stored in counter 43 immediately prior to the counter being reset. The bits stored in latch 52 are supplied in parallel to four bit adder matrix 53 which derives a four parallel bit output signal that is coupled to four bit latch 54. Latch 54 is activated once every 64 bits of clock source 19 by coupling the output of modulo 64 counter 46 through delay element 155 to an enable input of latch 54. Delay circuit 155 interposes a delay considerably less than one bit length to isolate the input of latch 54 from the output of adder 53 while the adder output is undergoing a transition. The output of latch 54 is coupled back to the input of adder 53, whereby the adder and latch function as an error accumulator. Delay lock loop 13 is in a stable, locked state when no error signal is supplied by counter 43 and latch 52 to the input of adder 53. Under such circumstances, latch 54 stores a binary signal indicative of the amount of correction required for voltage controlled clock 19 to achieve phase lock between the sequence derived from feedback shift register 17 and the received biphase signal derived from detector 15.

The output signal of latch 54 is a four bit, sixteen level signal for controlling the phase of voltage controlled clock 19. Voltage controlled clock 19 preferably includes a sixteen phase clock generator 55 that is driven by a constant frequency and phase oscillator, the frequency of which is sixteen times the bit rate of the L format biphase signal. The signals on the sixteen output leads of clock generator 55 are phase displaced by one-sixteenth of a cycle so that transitions occur on adjacent leads one-sixteenth of a cycle apart. The sixteen output leads of clock generator 55 are supplied to a selector or multiplexing circuit 56 having a single output lead 57 which forms the output of voltage controlled clock 19. Selector circuit 56 is controlled by the output signal of latch network 54 so that one of the sixteen input leads to the selector circuit is coupled to the output lead 57, depending upon the magnitude of the binary signal stored in latch 54.

A preferred embodiment of bit detector 31, which converts the L format biphase input signal to an NRZ signal having the same information content as the output of filter 12, includes a pair of identical channels of integration, hold, sample and dump circuitry with synchronous commutation/decommutation at its inputs and outputs. Because of the biphase L format of the signal applied to detector 31, one channel of the detector integrates the detector input signal during every other bit period of clock source 19 and the other channel integrates the detector input signal during the remaining bit periods; the direction of integration is determined by the bit value of the particular period. The final integrated values are held and sampled and then dumped during the bit periods when a particular channel is not integrating. At the end of the hold interval for each channel, the integrator in the channel is discharged and is thereby ready to resume integration of the next bit. The output signals of the hold circuits of the two channels are converted to an NRZ signal by a threshold detector. Because of the polarity switching of the integrators in the middle of the period of clock source 19, the output of the threshold circuit is of the NRZ format.

Figure 3:
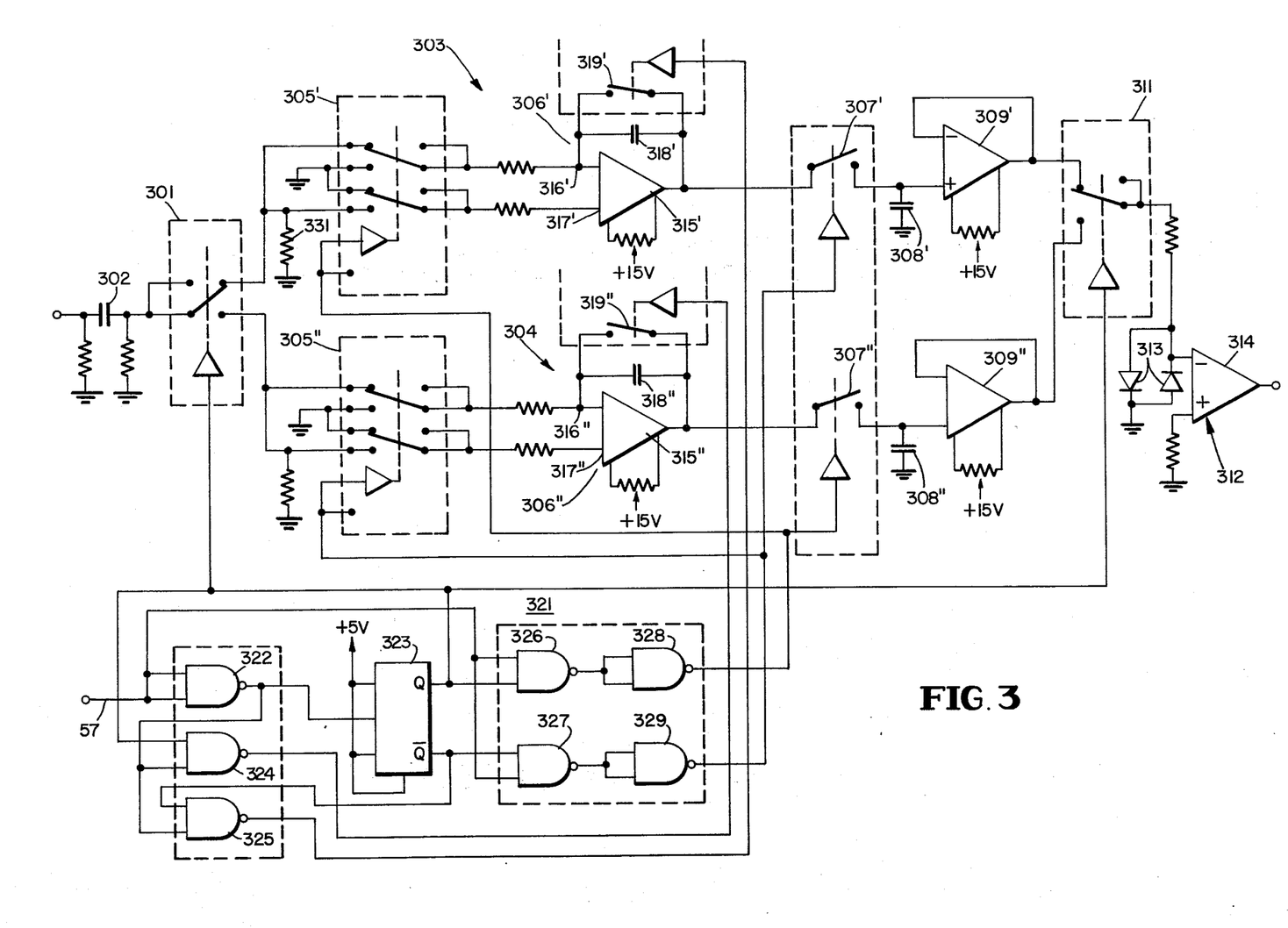
FIG. 3 is a block diagram of an L format biphase to NRZ detector included in FIG. 1.

One embodiment for implementing the L format biphase input to NRZ output detector and decoder is illustrated in FIG. 3. Basically, the apparatus of FIG. 3 includes a commutating switch 301 that is responsive to the output signal of source 11, as coupled through high pass filter 302. Commutating switch 301 drives a pair of parallel channels 303 and 304 in sequence, during alternate bit periods of the signals derived on lead 57 from the clock source. Each of channels 303 and 304 includes a reversing switch 305 responsive to the output of commutator 301. Reversing switch 305 drives a cascaded arrangement of an integrator 306, a sampling switch 307, a shunt holding capacitor 308, and an operational amplifier 309; the circuit elements 305–309 for channels 303 and 304 are respectively indicated by prime and double prime notations. The output signals of channels 303 and 304 are derived from amplifiers 309 and coupled to decommutating switch 311 which drives a threshold detector 312 including parallel, back-to-back diodes 313 which are shunted across the inverting input terminal of operational amplifier 314. Switches 301, 305, 307 and 311, as well as switches included in integrators 306, are actually the source drain path of field effect transistors, although they are illustrated as being of the relay type, for purposes of simplicity. Each of integrators 306 includes an operational amplifier having inverting and non-inverting input terminals 316 and 317, as well as a feedback capacitor 318, which is connected between the amplifier output terminal and its inverting input terminal 316. Capacitors 318 are periodically discharged by closing switches 319 which selectively shunt the capacitor electrodes.

Figure 4A:
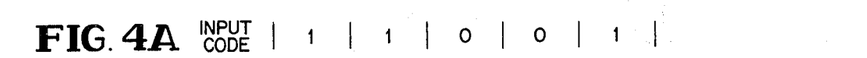
FIG. 4 are illustrations of waveforms in the apparatus of FIG. 3.
Figure 4B:
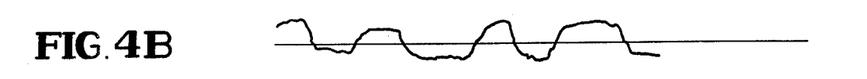
Figure 4C:
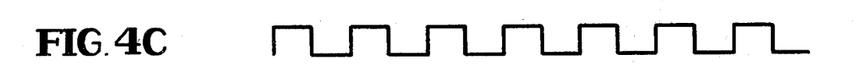
Figure 4D:
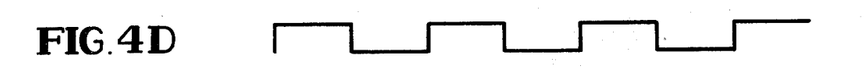
Figure 4E:
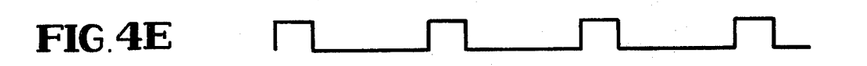

Control for the operation of switches 301, 305, 307, 311, and 319 is provided by timing pulses derived from network 321, which is responsive to the square wave clock signal on lead 57 (illustrated in FIG. 4C). Timing network 321 includes inverter 322 which is responsive to the clock signal on lead 57 and which drives a trigger input of J-K flip-flop 323. Flip-flop 323 includes principle (Q) and complementary (Q̄) output terminals which respectively drive input terminals of NAND gates 324 and 325, that are also responsive to the output of inverter 322. The binary signals at the Q and Q̄ output terminals of flip-flop 323 are also respectively applied to input terminals of NAND gates 326 and 327; NAND gates 326 and 327 are also responsive to the clock signal on lead 57 to respectively derive the rectangular waves of FIGS. 4J and 4I. The signal at the Q output terminal of flip-flop 323 (FIG. 4D) is applied in parallel to activate commutating and decommutating switches 301 and 311 so that the two switches are connected to only one of channels 303 or 304 at any particular instant. Flip-flop 323 thereby acts as a frequency divider for the clock signal on lead 57 to derive a square wave to control the activation of switches 301 and 311 so that the switches are in alternate positions during alternate bits of an input signal coupled through filter 302. Control of polarity reversing switch 305' and sampling switch 307'' is in response to the rectangular wave output of inverter 329 (FIG 4E), which is responsive to the output signal of NAND gate 327. Hence, each of NAND gates 326 and 327 and inverters 328 and 329 derives a different phase of a four phase signal having the same frequency as the output of flip-flop 323. The rectangular waves derived from NAND gates 325 and 324 control the closure of switches 319 and thereby control dumping of the charge stored on capacitors 318 at the end of a two-bit cycle associated with each of channels 303 and 304.

Figure 4F:
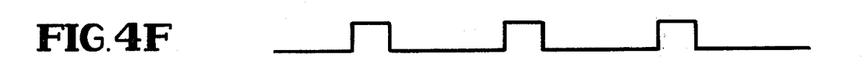
Figure 4G:
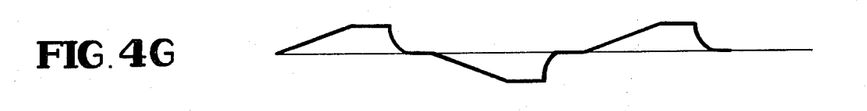
Figure 4H:
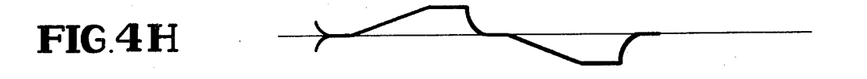
Figure 4I:
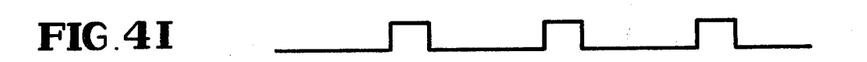
Figure 4J:
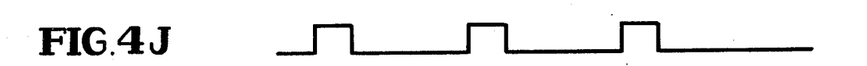
Figure 4K:
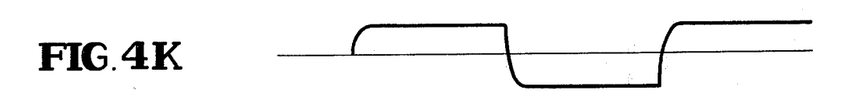
Figure 4L:
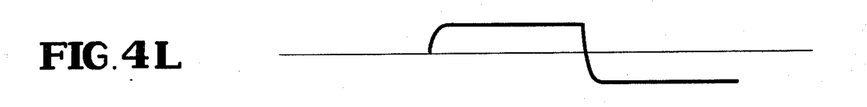
Figure 4M:
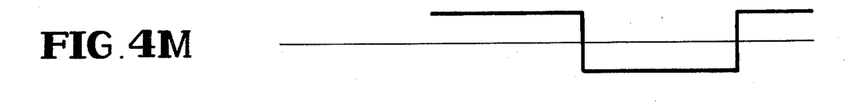
Figure 4N:
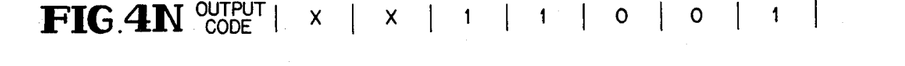
Figure 5:
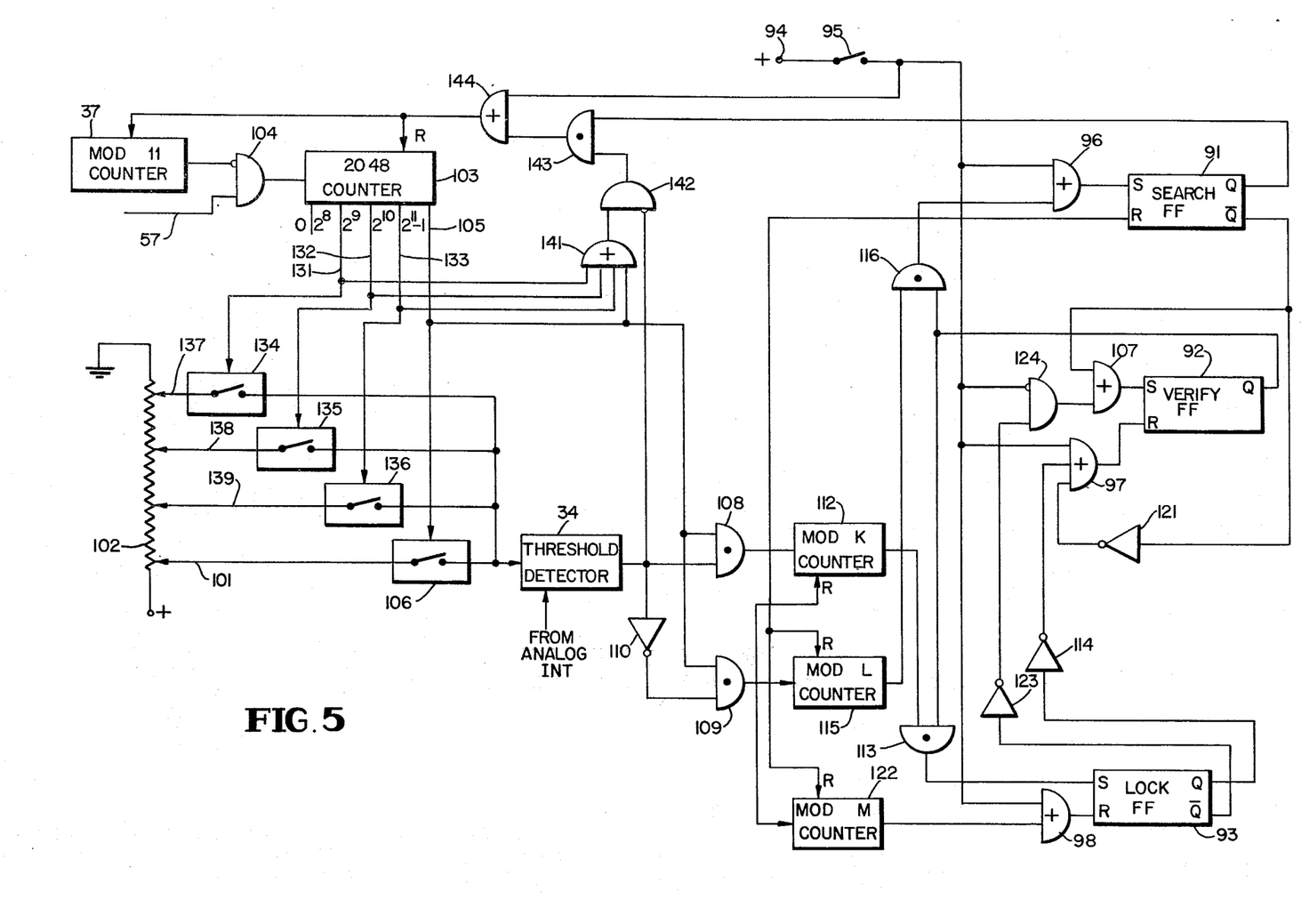
FIG. 5 is a block diagram of the apparatus included in the synch strategy counters of FIG. 1.

To provide a better and more complete understanding as to the manner in which the apparatus of FIG. 3 functions to convert the biphase signal indicated in FIG. 4B, and derived from filter 302, into an NRZ signal at the output of amplifier 314, greater consideration is given to the waveforms of FIGS. 4A–4N. The first five bits of the input signal are assumed to consist of the binary bits 11001 illustrated in block form in FIG. 4A and by the undulations of FIG. 4B. It is assumed that there is exact synchronization between the clock signal on lead 57 and the signal derived from filter 302, as indicated by FIGS. 4B and 4C.

During the first bit of the signal derived from filter 302, commutating switch 301 is activated to the position illustrated wherein the input signal is coupled to channel 303. During the first half of the first bit, switch 305 is activated in response to the output of inverter 328 to the illustrated position so that a positive signal is applied to the inverting input terminal 316' of amplifier 315', causing a positive going ramp to be derived at the output terminal of amplifier 315' (FIG. 4G). During the second half of the first bit, the output of inverter 328 drives switch 305' to the other position so that the negative portion of the input signal is coupled through switch 301 to the non-inverting input terminal 317' of amplifier 315. Thereby, the alternate polarity replicas of the two halves of the first biphase bit cause a positive going ramp at the output terminal of operational amplifier 315 to be derived for the length of the bit, as illustrated by FIG. 4G. At the end of the first bit period a positive voltage exists at the output terminal of amplifier 315'.

As illustrated in FIG. 4G, the positive voltage is maintained constant at the output terminal of amplifier 315' during the first half of the second bit. To this end, switch 301 is activated by the waveform of FIG. 4D during the second bit so that channel 303 is unresponsive to the signal coupled through filter 302. During the first half of the second bit, switch 305' is activated by the waveform of FIG. 4F so that ground potential is coupled through resistor 331 to the noninverting input terminal 317' of amplifier 315' and the inverting input terminal 316' of the amplifier is connected directly to ground. Thereby, there is no change in the output voltage of amplifier 315' during the first half of the second bit.

During the first half of the second bit, switch 307' is closed in response to the waveform of FIG. 4F to couple the constant positive output voltage of amplifier 315' to shunt capacitor 308'. Thereby, capacitor 308' is charged to approximately the same voltage as at the output of amplifier 315' and retains this charge for at least two bit periods, as illustrated by FIG. 4K. The voltage on capacitor 308' is not at this time, however, coupled to threshold detector 312 since decommutating switch 311 is activated by the waveform of FIG. 4F to be connected to the output of channel 304, rather than channel 303.

The voltage on capacitor 308' is coupled to threshold detector 312 during the entire third bit, during which time decommutating switch 311 is activated in response to the waveform of FIG. 4D to connect the output of amplifier 309' to the input of amplifier 314'; the resulting waveform during the third bit is illustrated in FIG. 4M. Hence, a two-bit delay exists between the time when a biphase input signal is coupled through filter 302 to the time when a corresponding NRZ output signal is derived from threshold detector 312. Since a delay of two bits is easily achievable for the reference sequence, such delay causes no problems in the operation of the system.

In order to return channel 303 to the same initial condition at the beginning of every other bit, the charge built up on capacitor 318 is discharged during the second half of each even numbered bit. Hence, capacitor 318' is discharged during the second half of the second bit in response to the waveform illustrated in FIG. 4I to produce the discharge portion of the FIG. 4G waveform.

Channel 303 functions in the manner stated for bit one for each subsequent odd numbered bit, having a binary one value; for binary zero values, the ramp of integrator 306' is in the negative direction. Channel 304 is similarly responsive to the timing signals derived from network 321 in the same manner described with regard to channel 303, but during the alternate bits. Hence, during even numbered bits, channel 304 is responsive to the output of commutating switch 301 to cause charging of capacitor 318'' as illustrated in FIG. 4L and supplies a signal to threshold detector 312 for a bit that occurred two bit times prior to the bit coupled to the threshold detector. During the first half of the even numbered bits, switch 305'' is activated by the waveform of FIG. 4F to the position illustrated and during the remainder of the time, switch 305'' is activated to its alternate state to cause integrator 306'' to be activated to produce the output of FIG. 4H. During the first half of each odd numbered bit a constant signal is derived from amplifier 315'' to indicate the magnitude of the even numbered biphase bits, and this level is coupled through switch 307'' to capacitor 308''. During the second half of each odd numbered bit, switch 319'' is closed in response to the waveform of FIG. 4J to discharge capacitor 318'' and restore channel 304 to the same initial state at the beginning of each even numbered bit. Threshold detector 312 is respectively responsive to the outputs of channels 304 and 305 (FIG. 4L) during each odd and even numbered bits to derive the NRZ waveform of FIG. 4M, which is coded into the XX11001 binary signal indicated by FIG. 4N; the XX code indicates the two bit delay between the input and output wavetrains.

In FIG. 4, there is illustrated one embodiment of the apparatus included in the sync strategy counters 35 and for controlling the threshold level of detector 34 during different segments of a search mode.

The circuit of FIG. 4 includes three flip-flops 91, 92 and 93 which are activated into the set state in response to the system being in the search, verify and lock modes, respectively. In the search mode, shift register 17 may be loaded with estimates of the received pseudorandom sequence. When the system is not in the search mode, but is in the verify or lock mode, no estimates of the pseudorandom sequence can be loaded into shift register 17. Each of flip-flops 91–93 includes set and reset terminals which are responsive to positive going transitions in the waveforms or voltage applied to them. Initially, flip-flop 91 is activated into the set state, while flip-flops 92 and 93 are activated into the reset state, a result achieved by feeding a positive D.C. voltage at terminal 94 through manually activated start switch 95 to the set input terminal of flip-flop 91 and the reset input terminals of flip-flops 92 and 93; coupling to the set input terminal of flip-flop 91 is via OR gate 96, while coupling to the reset terminals of flip-flops 92 and 93 is via OR gates 97 and 98.

Flip-flop 91 is maintained in the set state until source 11 derives one complete pseudorandom sequence in which the output of analog integrator 33 achieves or exceeds a predetermined threshold level associated with a predetermined correlation between the received and internally generated pseudorandom sequences. Flip-flop 91 is activated into the reset state under these circumstances by comparing the output signal of analog integrator 33 with a predetermined threshold value derived from tap 101 of potentiometer 102 after a complete pseudorandom sequence has been derived from feedback shift register 17. The position of tap 101 is adjusted to be indicative of the desired correlation estimate necessary to achieve synchronization between the two complete pseudorandom sequences.

To test correlation at the end of a complete sequence, the clock signal on lead 57 is coupled to a clock input of counter 103, having a maximum capacity equal to the number of bits in the pseudorandom sequence (2047 in the present instance). The signal on lead 57 is supplied to the clock input of counter 103 via gate 104 that is inhibited by a binary one output of modulo eleven counter 37. Thereby, the clock signal is gated into the clock input of counter 103 only after the initial estimate has been loaded into feedback shift register 17. In response to 2047 clock bits being loaded into counter 103 since the last time counter 37 reached a count of eleven, a binary one level is derived on output lead 105 of the counter, to activate normally open switch 106 into a closed state for one bit. During this bit interval the analog level on tap 101 is coupled to threshold detector 34 and compared with the analog voltage derived from integrator 33. At the completion of a pseudorandom sequence, the binary level derived from threshold detector 34 is sampled by activating AND gates 108 and 109 which are respectively responsive to the output of the detector and to an inverted replica of the output, as derived from the output of inverter 110. Thereby, AND gates 108 and 109 respectively derive binary one levels in response to threshold detector indicating that bit synchronization exists over a complete pseudorandom sequence (a good frame) and does not exist over a sequence (a bad frame). The output signal of AND gate 108 is coupled to the reset input of flip-flop 91, thereby causing the flip-flop to be activated to the reset state. If no output is derived from gate 108 at the end of a sequence, flip-flop 91 remains in the set state and a new pseudorandom sequence estimate is loaded into register 17.

In response to flip-flop 91 being activated into the reset state, a positive going transition occurs at the complementary ($\bar{Q}$) output terminal of the flip-flop. The positive going transition is coupled to the set input of verify flip-flop 92 via OR gate 107, to activate the flip-flop into the set state and the system into the verify mode.

Verify flip-flop 92 remains in the set state until K consecutive good frames have been received or until L consecutive bad frames have been received (where K and L are pre-selected integers greater than one). In the event of K consecutive good frames being received, flip-flop 92 is activated to the reset state and flip-flop 93 is activated to the set state; in the event of L consecutive bad frames being received, flop-flop 92 is activated to the reset state and flip-flop 91 is again activated to the set state. To these ends, the output of AND gate 108 is applied to a clock input of modulo K counter 112 which derives a binary one level in response to K pulses being applied to its clock input by AND gate 108. The binary one output of counter 112 is coupled through AND gate 113 to the set input of flip-flop 93 when flip-flop 92 is in the set state. In response to flip-flop 93 being activated to the set state, a negative going transition is derived from the principle (Q) output terminal of flip-flop 93. The negative going transition at the Q output of flip-flop 93 is reversed in polarity by inverter 114, which derives a positive going output that is coupled to the reset input of flip-flop 92 via OR gate 97. Thereby, flip-flop 92 is activated to the reset state and flip-flop 93 is in the set state after K consecutive good frames have been received. In the event of a bad frame being received before K consecutive good frames are received, a binary one output is derived from AND gate 109 prior to a binary one output being derived from counter 112. The binary one output of AND gate 109 resets counter 112 to zero, whereby no output is derived from counter 112 until K consecutive good frames have been received.

Modulo L counter 115 is provided to determine if L consecutive bad frames are received. To this end, counter 115 includes a clock input responsive to the output of AND gate 109 and a reset input responsive to the output of AND gate 108. The output of counter 115 is a binary one level only after L consecutive pulses have been supplied to the counter by AND gate 109, without a reset input being applied to the counter. With the system in the verify mode, the binary one level derived from the set output of flip-flop 92 enables AND gate 116 so it can couple the binary one level derived from counter 115 to the set input of flip-flop 91, thereby causing flip-flop 91 to be again activated to the set state. Flip-flop 92 is activated to the reset state in response to flip-flop 91 being activated to the set state by coupling the negative going transition at the Q output of flip-flop 91 to inverter 121, having an output which is coupled to the reset input of flip-flop 92 via OR gate 97.

The system is maintained in the lock mode until M (where M is an integer greater than one) consecutive bad frames are received, in which event the system switches from the lock to the verify mode. To this end, the output of AND gate 109 is applied as a clock input to modulo M counter 122, having a reset input responsive to the output of AND gate 108. In response to M consecutive bad frames being received, a binary one level is derived at the output of counter 122. The binary one output of counter 122 is coupled through OR gate 98 to the reset input of flip-flop 93, causing that flip-flop to be activated from the set to the reset state. In response to flip-flop 93 being activated to the reset state, a negative transition is derived from the $\bar{Q}$ output terminal of the flip-flop; this negative going transition is converted into a positive going transition by inverter 123. The positive going transition at the output of inverter 123 is coupled through INHIBIT gate 124 and OR gate 107 to the set input of verify flip-flop 92, causing the verify flip-flop to be activated to the set state. INHIBIT gate 124 prevents the negative going transition at the $\bar{Q}$ output terminal of flip-flop 93 from being coupled to the set input of flip-flop 92 when the system is initially activated, i.e., when switch 95 is initially closed.

One feature of the present invention is that feedback shift register 17 can be loaded more often than once a frame while the system is in the search mode, if inadequate correlation is provided at intermediate points in the frame. To this end, counter 103 includes intermediate taps 131–133, on which are derived binary one levels in response to the counter being loaded with counts of $2^8 = 256$, $2^9 = 512$, and $2^{10} = 1024$. The signals on leads 131–133 are respectively applied as enable inputs to normally open switches 134–136 which are responsive to the voltages at potentiometer sliders 137–139. The voltages at sliders 137–139 are of increasing levels and are selected in accordance with different correlation function estimate values for different segments of the pseudorandom sequence or frame being completed. Comparisons of the levels of the voltages at taps 137–139 with the correlation function estimate are obtained by feeding the voltages coupled through switches 134–136 during each one bit period of clock source 19 to one input of threshold detector 34.

In response to a binary zero output of threshold detector 34 at any of the sampling intervals during the search mode when switches 134–136 and 106 are activated, counters 103 and 37 are reset to initiate a new search cycle. To these ends, the output signals of counter 103 on leads 131–133 and 105 are combined in OR gate 141, which derives an output signal that is coupled to an input of INHIBIT gate 142. INHIBIT gate 142 is responsive to the binary level derived from threshold detector 34, whereby the binary one output of OR gate 141 is coupled through the INHIBIT gate only when the analog input of the threshold detector is less than the input of the detector that is coupled through switches 134–136 and 106. A binary one output of INHIBIT gate 142 thereby indicates that the correlation function estimate derived from analog integrator 33 did not achieve the different threshold values associated with the different portions of the pseudorandom sequence. The binary one output of INHIBIT gate 142 is coupled through AND gate 143 while the system is in the search mode by enabling the AND gate in response to the binary one level at the Q output of flip-flop 91. A binary one output of AND gate 143 is coupled through OR gate 144 to the reset inputs of counters 37 and 103. OR gate 144 is also responsive to a positive going transition which occurs in response to the system being activated into a start state, which is derived in response to switch 95 being initially closed. Thereby a new pseudorandom estimate is loaded into shift register 17 when the system is initially started or when inadequate correlation exists between the received and locally generated pseudorandom sequences during differenct segments of the sequences while the system is in the search mode.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for phase locking an L format biphase input signal having a pseudorandom sequence comprising a source of said input signal, a feedback shift register for deriving a non-return to zero output signal having the same sequence as the input signal, means for comparing said input and output signals to derive a binary error signal having first and second levels respectively indicative of the input and output signals having the same and different binary levels, filter means responsive to the error signal for deriving a control signal, a clock source coupled to a clock input of the shift register, and means for controlling the occurrence time of transitions derived from the clock source coupled to the clock input in response to the control signal.

2. The apparatus of claim 1 wherein the filter means includes a counter for periodically deriving a digital signal indicating the phase displacement between the input and output signals applied to the first comparing means over the period between adjacent derivations of the digital signal, and means for accumulating the digital signals to derive a control signal for the transition times of the clock source.

3. The apparatus of claim 2 wherein the clock source includes means for deriving multiphase clock wave trains on multiple leads, and means for coupling the waveform on one of the leads to a single output lead in response to the control signal for the transition times.

4. Apparatus for simultaneously phase locking and acquiring synchronization of an L format biphase input signal having a pseudorandom sequence comprising a delay lock loop responsive to the input signal, said loop including: a source of clock signals having controlled transition times, a feedback shift register advanced in response to transitions of the clock source for deriving a first non-return to zero output signal having the same pseudorandom sequence as the input signal, first means for comparing the input and output signals to derive a binary error signal, a digital filter responsive to the binary error signal for controlling the transition times, said filter being activated in synchronism with the transition times; means for converting the input signal into a second non-return to zero signal having the same information content as the input signal, second means for comparing the first and second non-return to zero signals to derive a third signal indicative of an estimate of the correlation function between the input and first signals, and means for loading bits of the second signal into the shift register until the correlation value indicated by the third signal achieves a predetermined value.

5. The apparatus of claim 4 wherein the filter includes a counter for periodically deriving a digital signal indicating the phase displacement between the input and output signals applied to the first comparing means over the period between adjacent derivations of the digital signal, and means for accumulating the digital signals to derive a control signal for the transition times of the clock signal.

6. The apparatus of claim 5 wherein the clock source includes means for deriving multi-phase clock wave trains on multiple leads, and means for coupling the waveform on one of the leads to a single output lead in response to the control signal for the transition times.

7. The apparatus of claim 4 wherein the clock source includes means for deriving multi-phase clock wave trains on multiple leads, and means for coupling the waveform on one of the leads to a single output lead in response to a control signal for the transition time derived from the digital filter means.

8. The apparatus of claim 4 wherein the means for converting includes a pair of parallel channels having inputs and outputs that are respectively commutated and decommutated at the frequency of the clock source, said commutated inputs being responsive to the biphase signal, each of said channels including:
an integrator responsive during alternate half cycles to opposite polarity replicas of alternate bits of the biphase signal, and a sample and hold network responsive to the integrator.

9. The apparatus of claim 4 further including means for testing the magnitude of the third signal against plural different levels during different segments of one complete sequence of the input signal, the correlation magnitude associated with the different levels increasing as the lengths of the different segments increase, and means for reloading bits of the second signal into the shift register in response to any of the tests indicating the correlation magnitude of the third signal being less than the level against which it is tested.

10. The apparatus of claim 4 further including means for maintaining the apparatus in a search mode while the apparatus is acquiring synchronization and phase lock, means responsive to the third signal having a value associated with a correlation magnitude at least equal to a predetermined value after one complete sequence of the input signal has been derived for deriving an indication of a good frame being derived, means for activating the apparatus out of the search mode and into a second mode in response to the indication of a good frame being derived, means for maintaining the apparatus in the second mode until P consecutive bad frames are derived, where P is an integer greater than one and a bad frame is the opposite of a good frame, and means for activating the apparatus into the search mode in response to P consecutive bad frames being derived, and means for maintaining the pseudorandom sequence derived from the shift register constant while the apparatus is in the second mode.

11. The apparatus of claim 4 further including means for maintaining the apparatus in a search mode while the apparatus is acquiring synchronization and phase lock, means responsive to the third signal having a value associated with a correlation magnitude at least equal to a predetermined value after one complete sequence of the input signal has been derived for deriving an indication of a good frame being derived, means for activating the apparatus out of the search mode and into a verify mode in response to the indication of a good frame being derived, means for maintaining the apparatus in the verify mode until L consecutive bad frames are derived, where L is an integer greater than one and a bad frame is the opposite of a good frame, means for activating the apparatus into the search mode in response to L consecutive bad frames being derived, and means for activating the apparatus into a lock mode in response to K consecutive good frames being derived while the apparatus is in the verify mode, means for maintaining the apparatus in the lock mode until M consecutive bad frames are derived, and means for activating the apparatus into one of the other modes in response to M consecutive bad frames being derived while the apparatus is in the lock mode, where K, L and M are integers greater than one, and means for maintaining the pseudorandom sequence derived from the shift register constant while the apparatus is in the verify and lock modes.

12. Apparatus for simultaneously phase locking and acquiring synchronization of an input signal having a pseudorandom sequence comprising a source of said input signal, a delay lock loop responsive to the input signal, said loop including: a source of clock signals having controlled transition times, a feedback shift register advanced in response to transitions of the clock source for deriving a first output signal having the same pseudorandom sequence as the input signal, means for comparing the input and output signals to derive a binary error signal, a digital filter responsive to the binary error signal for controlling the transition times, said filter being activated in synchronism with the transition times; means for comparing the first and second signals to derive a second signal indicative of an estimate of the correlation function between the input and first signals, and means for loading bits of the second signal into the shift register until the correlation value indicated by the third signal achieves a predetermined value.

13. The apparatus of claim 12 wherein the filter includes a counter periodically deriving a digital signal indicating the phase displacement between the input and output signals applied to the first comparing means over the period between adjacent derivations of the digital signal, and means for accumulating the digital signals to derive a control signal for the transition times of the clock signal.

14. The apparatus of claim 13 wherein the clock source includes means for deriving multi-phase clock wave trains on multiple leads, and means for coupling the waveform on one of the leads to a single output lead in response to the control signal for the transition times.

15. Apparatus for simultaneously phase locking and acquiring synchronization of an L format biphase input signal having a pseudorandom sequence comprising a source of said input signal, a delay lock loop responsive to the input signal, said loop including: a source of clock signals having controlled transition times, a feedback shift register advanced in response to transitions of the clock source for deriving a first non-return to zero output signal having the same pseudorandom sequence as the input signal, means for comparing the input and output signals to derive an error signal, a filter responsive to the error signal for controlling the transition times; means for converting the input signal into a second non-return to zero signal that has the same information content as the input signal, means for comparing the first and second non-return to zero signals to derive a third signal indicative of an estimate of the correlation function between the input and first signals, and means for loading bits of the second signal into the shift register until the correlation value indicated by the third signal achieves a predetermined value.

16. Apparatus for phase locking and acquiring synchronization of a pseudorandom input signal comprising a delay lock loop including: a pseudorandom output signal source, means for comparing the input and output signals to derive a phase indicating error signal, means responsive to the error signal for controlling the occurrence timed of bits in the pseudorandom output signal; means for comparing the input signal and the pseudorandom output signal to derive a signal indicative of an estimate of the correlation function between the input and the output signals, means for loading bits of the input signal into the source to cause the source to derive an output signal having bits that are an estimate of the sequence of the input signal, means for testing the magnitude of the correlation indicated by the correlating indicating signal against plural different correlation levels during different segments of one complete sequence of the input signal, the magnitude of the different levels increasing as the lengths of the different segments increase, and means for reloading bits of the input signal into the source in response to any of the tests indicating the magnitude of the correlation being less than the correlation level against which it is tested.

17. Apparatus for phase locking and acquiring synchronization of a pseudorandom input signal comprising a delay lock loop including: a pseudorandom output signal source, means for comparing the input and output signals to derive a phase indicating error signal, means responsive to the error signal for controlling the occurrence times of bits in the pseudorandom output signal; means for comparing the input signal and the pseudorandom output signal to derive a signal indicative of an estimate of the correlation function between the input and output signals, means for loading bits of the input signal into the source to cause the source to derive an output signal having bits that are an estimate of the sequence of the input signal, means for activating the apparatus into a search mode while the apparatus is acquiring synchronization and phase lock, means responsive to the correlation indicated by the correlating indicating signal having a value at least equal to a predetermined value after one complete sequence of the input signal has been derived for deriving an indication of a good frame being derived, means for activating the apparatus out of the search mode and into a second mode in response to the indication of a good frame being derived, means for maintaining the apparatus in the second mode until P consecutive bad frames are derived, where P is an integer greater than one and a bad frame is the opposite of a good frame, means for activating the apparatus into the search mode in response to P consecutive bad frames being derived, and means for maintaining the pseudorandom sequence derived from the source constant while the apparatus is in the second mode.

18. Apparatus for phase locking and acquiring synchronization of a pseudorandom input signal comprising a delay lock loop having: a pseudorandom output signal source, means for comparing the input and output signals to derive a phase indicating error signal, means responsive to the error signal for controlling the occurrence times of bits in the pseudorandom output signal; means for comparing the input signal and the pseudorandom output signal to derive a signal indicative of an estimate of the correlation function between the input and output signals, means for loading bits of the input signal into the source to cause the source to derive an output signal having bits that are an estimate of the sequence of the input signal, means for activating the apparatus into a search mode while the apparatus is acquiring synchronization and phase lock, means responsive to the correlating indicating signal having a value at least equal to a predetermined value after one complete sequence of the input signal has been derived for deriving an indication of a good frame being derived, means for activating the apparatus out of the search mode and into a verify mode in response to the indication of a good frame being derived, means for maintaining the apparatus in the verify mode until L consecutive bad frames are derived, means for activating the apparatus into the search mode from the verify mode in response to L consecutive bad frames being derived while the apparatus is in the verify mode, means for maintaining the apparatus in the verify mode until K consecutive good frames are derived, means for activating the apparatus into a lock mode in response to K consecutive good frames being derived, means for maintaining the apparatus in the lock mode until M consecutive bad frames are derived while the apparatus is in the lock mode, means for activating the apparatus from the lock mode into the verify mode in response to M consecutive bad frames being derived, and means for preventing bits of the input signal from being loaded into the pseudorandom source while the apparatus is in the verify and lock modes.

* * * * *